United States Patent [19]

Davidson

[11] Patent Number: 5,644,732

[45] Date of Patent: Jul. 1, 1997

[54] METHOD AND APPARATUS FOR ASSIGNING ADDRESSES TO A COMPUTER SYSTEM'S THREE DIMENSIONAL PACKING ARRANGEMENT

[75] Inventor: Howard L. Davidson, San Carols, Calif.

[73] Assignee: Sun Microsystems, Inc., Mountain View, Calif.

[21] Appl. No.: 480,025

[22] Filed: Jun. 7, 1995

Related U.S. Application Data

[63] Continuation of Ser. No. 954,269, Sep. 30, 1992, abandoned, which is a continuation-in-part of Ser. No. 553,439, Jul. 13, 1990, abandoned.

[51] Int. Cl.⁶ .................................................. G06F 12/02
[52] U.S. Cl. ......................... 395/284; 395/651; 395/652; 395/653
[58] Field of Search ................................... 395/651, 652, 395/653, 200.1, 284, 497.01, 828, 829, 830, 800; 340/825.07, 825.52

[56] References Cited

U.S. PATENT DOCUMENTS

| Re. 31,318 | 7/1983 | Kaufman et al. | 395/411 |
|---|---|---|---|
| 3,781,826 | 12/1973 | Beausoleil | 365/200 |
| 3,845,476 | 10/1974 | Boehm | 365/200 |
| 4,025,903 | 5/1977 | Kaufman et al. | 395/405 |
| 4,360,870 | 11/1982 | McVey | 395/829 |
| 4,373,181 | 2/1983 | Chisholm et al. | 395/421.01 |
| 4,730,251 | 3/1988 | Aakre et al. | 395/284 |
| 4,773,005 | 9/1988 | Sullivan | 395/829 |
| 4,885,721 | 12/1989 | Katanosaka | 371/10.2 |
| 4,918,598 | 4/1990 | Ashkin et al. | 395/823 |
| 5,038,320 | 8/1991 | Heath et al. | 395/830 |
| 5,065,277 | 11/1991 | Davidson | 361/383 |
| 5,226,123 | 7/1993 | Vockenhuber | 395/317 |
| 5,269,010 | 12/1993 | MacDonald | 395/405 |
| 5,293,607 | 3/1994 | Brockmann et al. | 395/405 |
| 5,317,693 | 5/1994 | Cuenod et al. | 395/829 |
| 5,357,621 | 10/1994 | Cox | 395/497.03 |

OTHER PUBLICATIONS

McVey, J.M., "Programmable Identification for VO Devices" *IBM Technical Disclosure Bulletin*, vol. 22, No. 3 (Aug. 1979) pp. 882–883.

*Primary Examiner*—Lance Leonard Barry
*Attorney, Agent, or Firm*—Blakely Sokoloff Taylor & Zafman

[57] ABSTRACT

A method and apparatus for providing address designations for a three dimensional computer system arranged in a plurality of planar layers is disclosed. Each layer comprises an incrementer for generating a layer identification value. A first layer has a starting value, representing the first layer identification value, and an incremental value which is added to the starting value to generate a second layer identification value. In this way, each incrementer on each layer is serially coupled to a next higher layer. A control processor accesses file information on each layer through use of the layer identification value. The register file identifies the layer as a memory module, processor module or input/output interface module. From the information contained within the register file, the control processor assigns an address to each of the layers. In addition, the control processor writes initialization parameters to the register file. The address and parameter data is then transferred to the module circuitry on the corresponding layer.

20 Claims, 5 Drawing Sheets

METHOD AND APPARATUS FOR ASSIGNING ADDRESSES TO A COMPUTER SYSTEM'S THREE DIMENSIONAL PACKING ARRANGEMENT

RELATED APPLICATIONS

This is a continuation of application Ser. No. 07/954,269 filed Sep. 30, 1992, now abandoned which was a continuation-in-part of application Ser. No. 07/553,439 filed Jul. 13, 1990, now abandoned, of which the subject matter is incorporated by reference herein.

BACKGROUND OF THE INVENTION

1. Field of the Invention

This invention relates to computer systems and, more particularly, to a method and apparatus for providing unique addresses for computer system components.

2. History of the Prior Art

In the typical computer system, circuit components such as a central processing unit and random access memory are arranged on a motherboard joined by a system bus. Usually slots are provided on the motherboard for connecting peripheral components to the system bus. In such a system, when peripheral devices are inserted into the slots to contact the bus they are given unique addresses by setting a series of switches or by reading addresses from the connector pins. Upon the application of power to the system, these addresses are used to allow the system to function with the peripheral equipment.

To provide more advanced systems, an arrangement for packaging planar arrays of circuit components in essentially parallel planes in which the arrays lie closely adjacent one another separated by insulating material has been devised. The new arrangement allows layers or planes of hybrid electronic circuits to be essentially laid against one another to form almost a solid block package while providing electrical access to circuitry at any level of the package at all edges of the outside of the package. Such a packaging arrangement is capable of providing a very fast powerful computer in a very small volume (e.g., four by four by one inches). U.S. Pat. No. 5,065,277, entitled Three Dimensional Packaging Arrangement for Computer Systems and the Like, Howard Davidson, issued Nov. 12, 1991.

Although such a computer is quite powerful and compact, the individual layers do not provide space for switches to indicate addresses or connectors with discrete addresses; and, consequently, addresses are not available to identify the components of the system. As with the peripheral arrangement using slots in the typical computer, however, the individual system components such as memory, processors, and input/output circuitry may reside in any plane of the system. It is, therefore, necessary to provide apparatus for uniquely identifying the individual components of the computer system so that the devices therein may be addressed.

SUMMARY OF THE INVENTION

It is an object of the present invention to provide a unique arrangement for providing addresses for identifying components of a three dimensional computer structure or similar electronic systems.

This and other objects of the present invention are realized in an arrangement which includes an incrementer with each individual component of the system. A first incrementer is assigned a first layer identification such as all zeroes, and the incrementers are joined serially. Each incrementer sees the value transferred to it from the preceding incrementer as its layer identification, adds a selected value to the value provided to it, and passes the incremented value to the next incrementer. In this manner each individual component of the system is provided an unique layer identification which may be utilized in system addressing.

In addition to the incrementers, each layer comprises a register file having a plurality of registers. One register contains type information identifying the layer as a memory module, input/output (I/O) interface module or processor module. Upon power-up of the computer system, a state machine or maintenance processor searches for a control processor located on one of the layers. Each layer is accessed through the use of its corresponding layer identification data, and the state machine reads a register from the register file to identify the type of module contained on that layer. Once a control processor is located, the state machine or maintenance processor issues a start command. The control processor then executes a configuration process which is stored as processor executable code on a non-volatile memory device.

In executing the configuration process, the control processor searches for memory module layers by reading type information stored in a register in the register file. In addition to identifying all of the memory module layers, the control processor reads information regarding both the memory capacity of the module and the results of a self test executed by the individual memory module. Knowing the usable capacity of all of the memory module layers, the control processor assigns addresses so as to optimize system performance. For example, the control processor may divide the memory into blocks and then interleave the addresses to enhance access timing of the apportioned memory blocks. The address information is then written to the memory module layers so that the layers may identify the address ranges.

After assigning addresses to the memory module layers, the control processor searches the remaining layers for I/O interface modules. The I/O interface modules, in addition to the type information, contain information about the devices which the module supports. The control processor then assigns addresses to access these I/O devices. In a multi-processor system, the control processor then searches the layers for processors. In a similar manner, addresses are assigned to the processor module layers.

These and other objects and features of the invention will be better understood by reference to the detailed description which follows taken together with the drawings in which like elements are referred to by like designations throughout the several views.

DETAILED DESCRIPTION OF THE INVENTION

A method and apparatus for addressing a three dimensional computer structure is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Figure 1A:
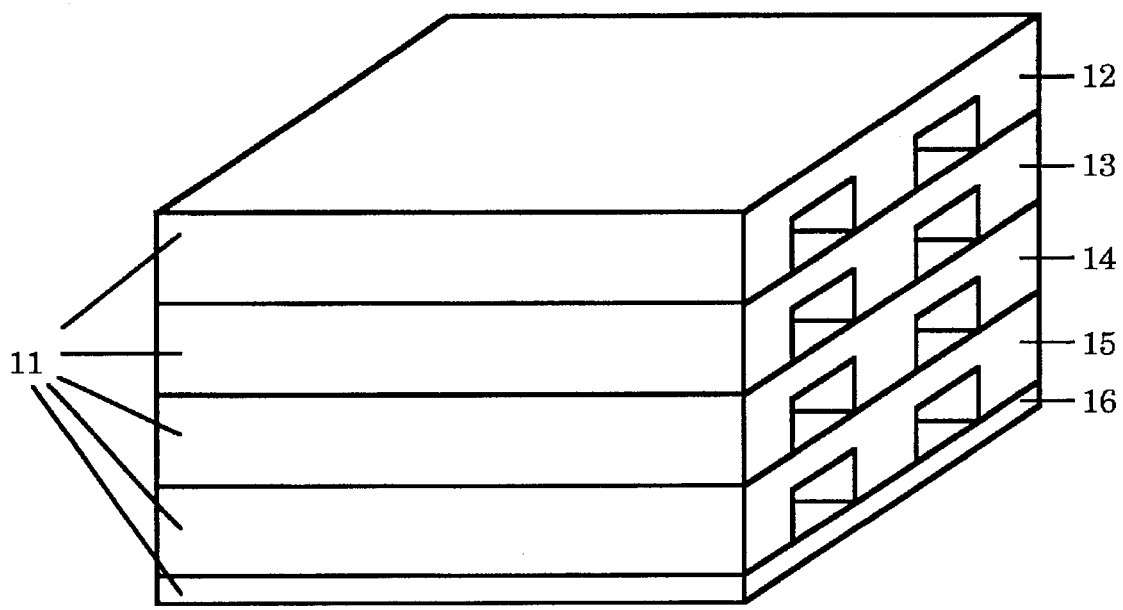
FIG. 1a is an isometric view of a packaging structure in which the invention may be utilized.
Figure 1B:
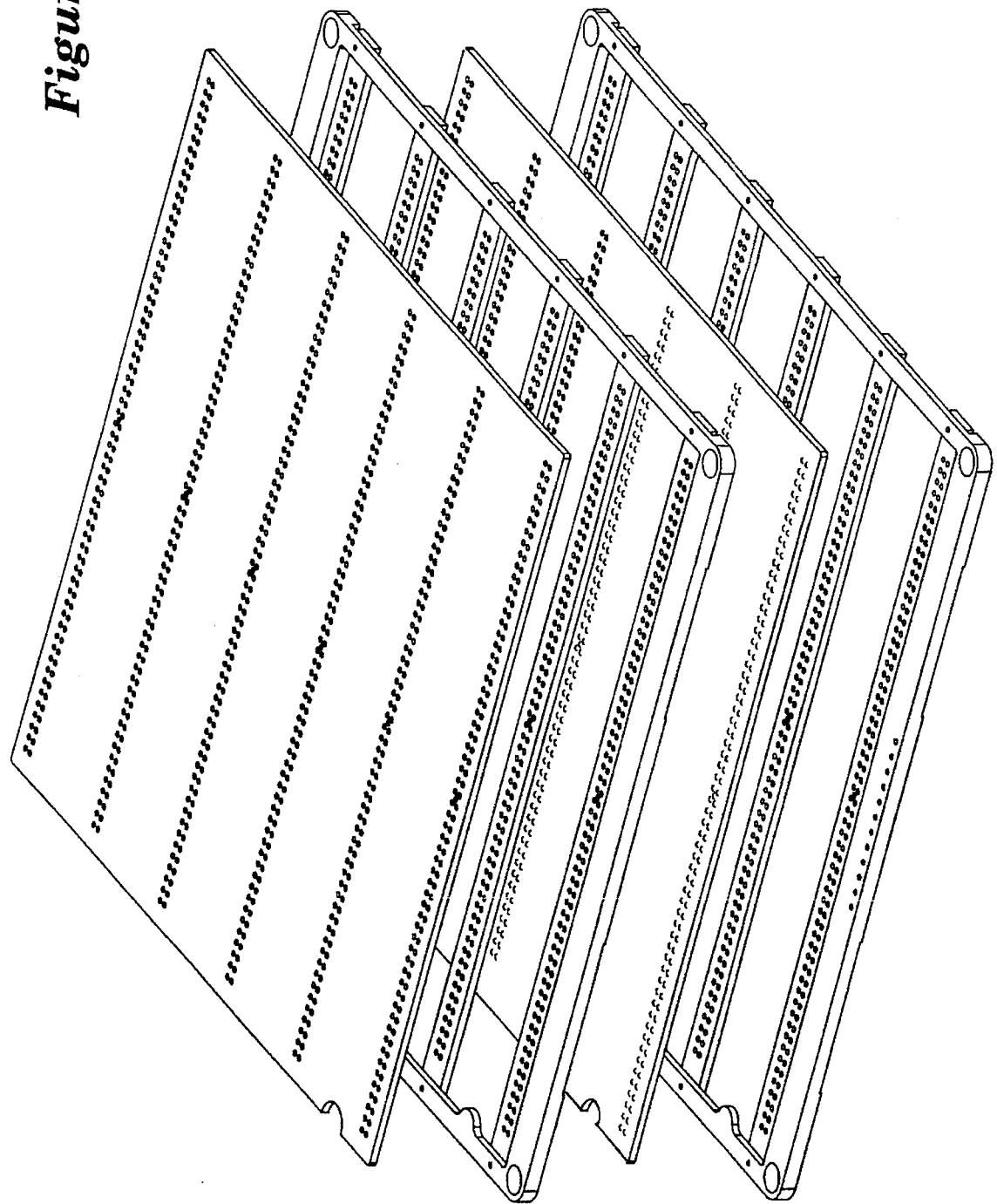
FIG. 1b is an isometric view of layers for a packaging structure in which the invention may be utilized.

Referring now to FIG. 1a, there is illustrated an isometric view of a packaging arrangement 10 constructed in accordance with the invention. The packaging arrangement 10 includes a plurality of individual layers 11 of circuit elements in general comprised of integrated circuits which may be any of a number of different components of larger systems. FIG. 1b illustrates printed circuit boards constructed in accordance with individual layers 11 in which integrated circuits can be inserted. For example, a first layer 12 may be a central processing unit for a computer, a second layer 13 and a third layer 14 may both be random access memory for the computer, and a fourth layer 16 may consist of input/output circuitry for the computer.

Each of the layers 11 comprises one or more circuit boards which may be hybrid circuits embedded in an insulating substrate. The layers 11 are all constructed to have opposing major surfaces parallel to one another so that a plurality of the layers 11 may be joined together to form a very densely packed electronic system. For example, it is expected that at least 16 processors and 0.5 gigabytes of random access memory may be arranged as described and occupy a volume of approximately four inches by four inches by one inch. Those skilled in the art will recognize that this arrangement may constitute a very powerful computer.

Each of the planar layers 11 of the arrangement 10 may be constructed using any technology which is capable of providing flat and parallel top and bottom surfaces. A presently preferred technology uses a single flat sheet of ceramic material as a substrate into which are carved pockets for receiving the integrated or hybrid circuit chips. The chips and the pocketed substrate layer are covered with a multi-layer interconnect. The conductors of the interconnect are in turn connected to conductors embedded in each substrate so that they conduct completely through each of the ceramic substrate layers to provide connections between layers 11. When two ceramic pocketed layers 11 are pressed together, the conductors between the layers 11 may act as computer buses. This provides an especially important advantage in computers because the extremely short length of these conductors (e.g., one inch) provides overall exemplary values of ½ nanohenries of inductance per connector, a few milliohms per connector of resistance, and 5 picofarads of capacitance for the stack. Such short conductors cut down the time to access circuit elements to a small fraction of the time required in present day computers.

The computer system illustrated in FIGS. 1a and 1b may be assembled so that a particular system component such as a processor may reside in any of the many possible planes of the three dimensional arrangement. It will be recognized that the arrangement does not provide the typical dip switches for indicating addresses or the typical slots into which a peripheral board may be inserted to connect with the system bus. Consequently, the addresses of the individual system components must be determined in some manner other than that conventionally utilized.

Figure 2:
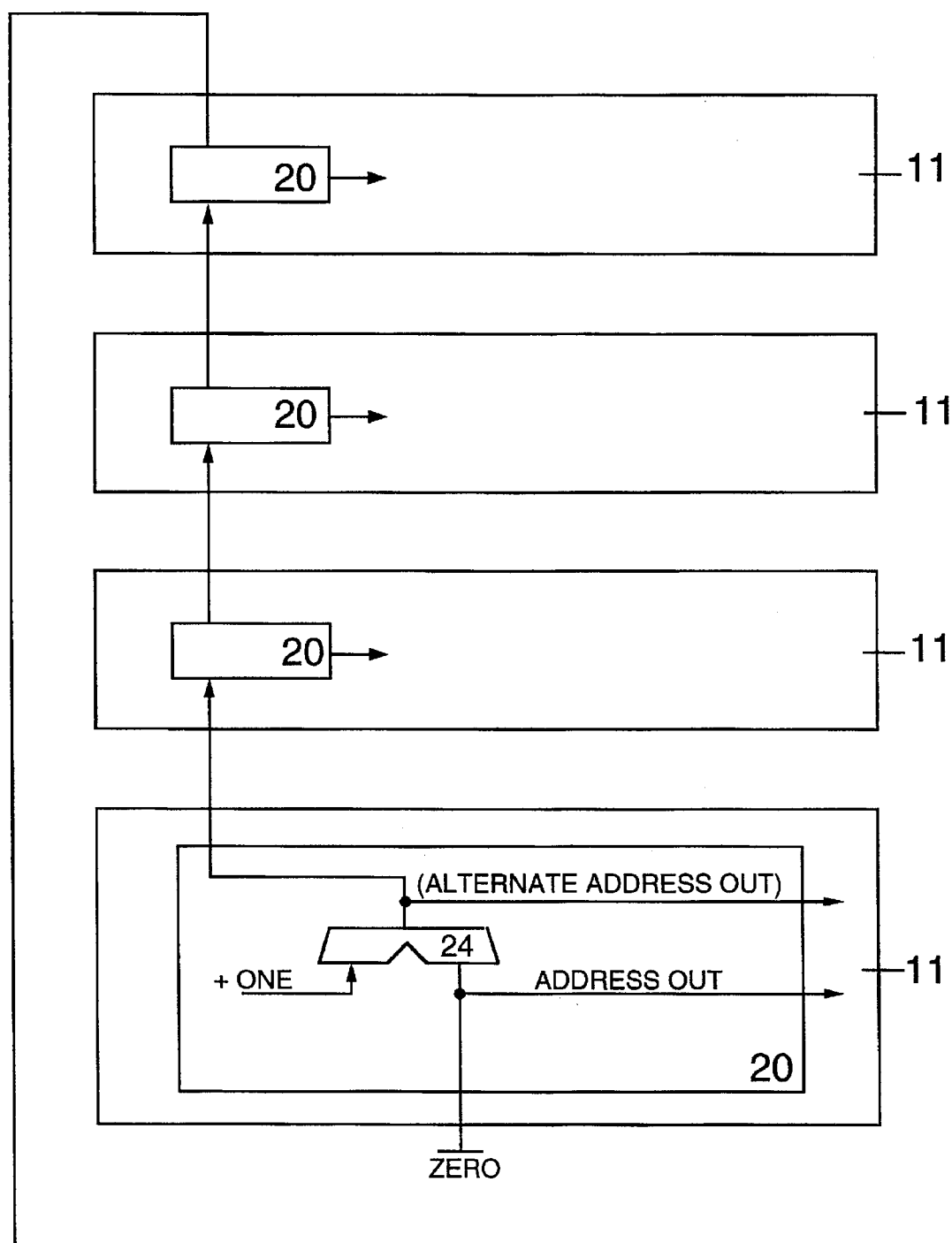
FIG. 2 is a circuit diagram illustrating a layer identification arrangement in accordance with the invention.

FIG. 2 illustrates an arrangement for assigning layer identification values to components of the computer system illustrated in FIGS. 1a and 1b. In FIG. 2, an incrementer 20 is provided in each individual system component or layer 11.

Thus, for example, the processor in layer 12 includes an incrementer, the random access memory in layer 13 includes an incrementer, the random access memory in layer 14 includes an incrementer, and the input/output circuitry in layer 16 includes an incrementer.

In the presently preferred embodiment of the invention, each incrementer or adder 20 has eight serially arranged bit positions. Upon power up of the computer system, the number at the input to the incrementer or in any register 22 has added to it a value such as one by an adder 24 in the incrementer 20, is transferred to the next adjacent incrementer 20, and is incremented at that next incrementer 20 by the value. A value other than one might also be used in incrementing the layer identification values if unequal layer identification value steps are desired for some purpose such as encoding memory size. The first incrementer 20 in the series may be given a value of eight zeroes (for example, by grounding all of the input bit positions) to designate a first layer identification. This value is used internally by that layer, incremented by one by the incrementer 20, and transferred to the incrementer 20 of the next layer. This new value totaling one is used by the second layer as its layer identification value, is incremented by one by the incrementer 20 of that layer, and is transferred to the next layer. Each layer accepts the number from the layer below, stores that number as its layer identification value, increments the number and transfers it to the next layer. In this manner, layer identification values are provided for each functional component of the system. Alternatively, the number provided to any incrementer might first be incremented, then used as the layer identification value of that layer, and finally transferred to the incrementer of the next layer. Either procedure would work.

In a particular system where the number of layers varies, it may be desirable to return the number of the highest layer to the controlling processor so that it may know how many components are included. This may be accomplished by a set of jumpers on a top clamp plate of the packaging arrangement 10 attached to the vertically bused lines in the substrate layers.

It should be noted that the designation of the layer identification values is essentially static in nature. Once the component layers are joined together as by clamping, the numbers are assigned layer identification values and need not be changed. It should also be noted that it is entirely conceivable that multiple numbering systems using additional ones of such small incrementers 20 in selected layers might be implemented in any particular system. Thus, for example, it would be possible to use one set of incrementers to designate layers of random access memory, and a second set to designate input/output layers.

Figure 3:
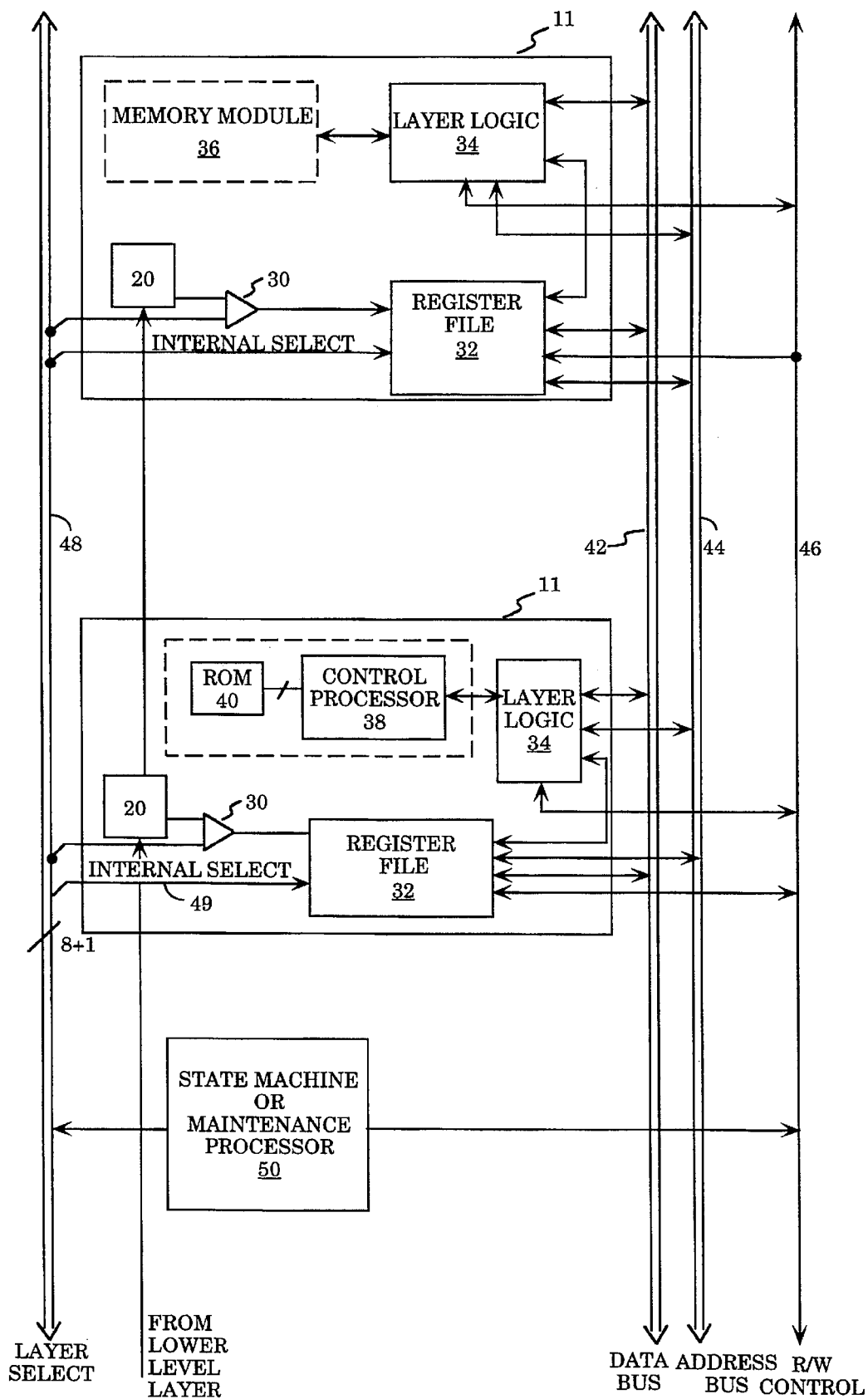
FIG. 3 is a block diagram illustrating two layers configured in accordance with the teachings of the present invention.

Referring to FIG. 3, a pair of layers 11 configured in accordance with the teachings of the present invention is illustrated. The individual layers comprise memory modules, processor modules or input/output (I/O) module interfaces. For purposes of explanation, FIG. 3 illustrates a processor module layer, which is the control processor of the system, and a memory module layer. However, a three dimensional computer structure will generally comprise a plurality of memory modules and I/O interface modules. In addition to the control processor layer, a multi-processor computer system employing the three dimensional computer structure of the present invention would have additional processor layers. Upon initial power-up of the computer system, state machine or maintenance processor 50 searches each of the layers for a control processor. To accomplish this task, state machine 50 places a layer identification value on the layer select bus 48. For simplicity, state machine 50 may start with layer identification value 0. The layer selection bus 48 is coupled to all layers on the three dimensional computer structure. In addition to the module circuitry and incrementer 20, each layer comprises a comparator 30, a register file 32 and layer logic 34. Comparator 30 has two inputs; a first input is coupled to layer select bus 48 and a second input is coupled to the output of incrementer 20. After state machine 50 transmits a layer identification value over the layer select bus 48, comparator 30 on each layer compares the value stored in incrementer 20 with the layer identification value. If the two values are the same, comparator 30 indicates a match and sends an enabling signal to register file 32.

Register file 32 contains a plurality of control registers used to initialize and control its corresponding layer 11. In addition to transmitting the layer identification value over layer select bus 48, state machine 50 also transmits a register address over address bus 44. The register address identifies a specific register within register file 32. In the preferred embodiment, the layer select bus 48 contains 8 bits for layer selection and an additional bit for an internal select. However, the register addresses may also be transmitted over a separate address bus. The registers located in register file 32 contain information concerning the layer module as well as initialization registers for initializing the layer module. For example, in the preferred embodiment, register 0 identifies the layer as either a processor module, an I/O interface module, or a memory module. In addition, register 0 may also contain additional information, such as the manufacturer of the module and the serial number. In order to locate the control processor, state machine 50 searches all of the layers, one at a time, and by reading register 0 from register file 32 of each layer, state machine 50 determines on which layer the control processor resides. After the state machine 50 finds the control processor, state machine 50 will issue a start command to control processor 38 through layer logic 34 as will be explained more thoroughly below.

The control processor 38 is illustrated as one of the layers 11 in FIG. 3. Control processor 38 comprises a start-up code stored in read only memory (ROM) 40. ROM 40 is coupled to control processor 38, and upon issuance of the start-up command from the state machine 50, control processor 38 executes a configuration process from instructions stored in ROM 40. Although a ROM memory is illustrated in conjunction with the present invention, any non-volatile memory device, such as a electrical erasable programmable read only memory (EEPROM) or a programmable read only memory (PROM), could be used. A utility of the present invention is the flexibility in which the three dimensional computer structure provides. Therefore, any number of different programs could be used to execute the configuration process. The actual configuration process employed would depend upon the particular application for the computer system.

In the preferred embodiment of the present invention, the control processor 38, in executing the configuration process 0, searches layers of the three dimensional computer structure for memory module layers. Searching for memory layers first allows the control processor 38, after assigning addresses to the memory module, to use the memory module for work space instead of operating only with the available registers on the control processor 38. The procedure for searching for memory in the three dimensional computer system is analogous to that of the state machine or maintenance processor 50 searching for a control processor. The control processor 38 places: a layer identification value on layer select bus 48; register 0's register file address on address bus 44; and R/W control line in the read mode. The control processor 38 could choose any order in which to search the layers. For example, control processor 38 may start the search at the bottom layer and search up, or start at the top layer and search down. All the individual layers receive the layer identification value at comparator 30. If the layer identification value stored in incrementer 20 is the same as the layer identification value in which control processor 38 writes onto layer select bus 48, then comparator 30 generates an enabling signal for register file 32. Upon being enabled, the contents of register 0 are placed on data bus 42. Through layer logic 34, control processor 38 reads the contents of register 0 placed on data bus 42. From the information contained in register 0, control processor 38 can identify the layer as a memory module.

In the preferred embodiment, control processor 38 searches every layer to initially determine the available memory. In addition to the layer identification value information contained in register 0, register 0 may also contain memory capacity for the corresponding memory module. Furthermore, each memory layer may initiate a memory self test. In the preferred embodiment, the results of the self test are stored in register 1 of register file 32. Control processor reads the contents of register 1, and consequently, if the memory self test indicates that a portion of a memory layer is not usable, then control processor 38 does not apportion an address to that portion within the corresponding memory module layer. Therefore, even though a particular memory portion may be unusable within a memory module layer, control processor 38 assigns continuous addresses to the memory module skipping the unusable portion of the memory.

Upon completion of searching all of the available layers for memory, control processor 38 next searches for the I/O interface layers. The process for identifying the layers as I/O interface modules is similar to that of searching for memory. Control processor 38 places a layer identification value on layer select bus 48, and the address of register 0 on address bus 44. Control processor 38 also sets the R/W control line 46 so as to read the contents of register 0 in file register 32. The register file 32 of the appropriate layer is enabled and the contents of register 0 are placed on data bus 42. Control processor 38 then reads the contents from data bus 42 through layer logic 34, to determine the identity of the layer. If the layer is an I/O card, then additional information is provided in register 0, or a supplemental register, which identifies the device for which the layer supports. Control processor 38 searches the remainder of the layers of the computer structure for I/O layers so as to obtain complete information regarding all I/O layers and the corresponding devices in which the I/O layers support.

If the three dimensional computer system is a multi-processor system, then the configuration process executed in control processor 38 would initialize the processor layer in a manner similar to memory and I/O initialization. Although each layer of the three dimensional computer structure is identified by a layer identification value, each device must still be assigned a physical or a virtual address such that the memory or device can be accessed by control processor 38. An advantage of the present invention is that any memory addressing configuration which supports all identified layers could be employed. The three dimensional computer structure of the present invention allows for complete flexibility in assigning physical or virtual memory addresses to the layers. The physical location of the layer does not mandate a particular address for any given device. Therefore, even though an entire memory module layer is unusable, the remaining memory module layers can still be accessed through continuous addressing.

Because of the complete flexibility provided with the three dimensional computer structure of the present invention, a memory addressing configuration which provides enhanced performance can be implemented. As one skilled in the art would appreciate, the most optimal memory addressing scheme may only be developed with a complete knowledge of the memory, I/O and processor layers. For example, interleaving memory addresses enhances performance through improved memory access timing. If the three dimensional computer system comprises multiple layers of memory, then control processor 38 allocates the available memory into several banks for interleaving. If control processor 38 has knowledge of the exact amount of memory before address allocation, then control processor 38 can devise such an optimal memory allocation system. For further information concerning interleaving memory addressing schemes, see A. J. van de Goor, Computer Architecture and Design, Addison-Wesley, 1989, pages 407–409. As illustrated in the above example, one skilled in the art could see the advantage in the flexibility provided by the three dimensional computer system of the present invention to allocate addresses based on knowledge of the layer modules of the system.

In addition to the registers contained in register file 32 described above, register file 32 contains a plurality of registers for initialization and control. For example, an I/O interface module layer may control a hard disk drive. In initialization of the system, the hard disk drive interface module layer requires a number of initialization parameters including the number of disk drives and the type of disk drives supported. To initialize the I/O interface module, control processor 38 places: the I/O interface module layer identification value on layer select bus 48; the initialization parameter on data bus 42; the address of the initialization registers on the I/O interface module on address bus 44; and R/W control 46 in the write mode. In this way, any number of initialization parameters can be written from the control processor 38 to the registers of register file 32.

Layer logic 34 couples the module circuitry of each layer to data bus 42, address bus 44, R/W Control 46 and register file 32. In the preferred embodiment, layer logic 34 comprises tri-state logic for latching data onto and from the external busses. In addition, layer logic 34 receives data from the registers contained within register file 32, and transfers the data to memory module 36. Layer logic 34 is intended to represent a broad category of bus interface logic modules which are well known in the art and will not be described further.

After the control processor 38 has allocated addresses to the individual layers 11 of the three dimensional computer structure, each layer must receive the address information so that the layer can recognize its address. In addition, initialization parameters written to register file 32 must also be transferred to the module circuitry. To accomplish this task, control processor 38 toggles the internal select line. In the preferred embodiment, file register 32 is dual port device such that the internal select line 49 selects the output of register file 32 to be coupled to either data bus 42 or to layer logic 34. However, any coupling device between layer logic 34 and file register 32 that allows the output of file register 32 to write to both data bus 42 and layer logic 34 could be employed. The control processor 38 sets both the internal select line 49 to select layer logic 34 as the output of register file 32 and the R/W control line to read. In addition, control processor 38 places an address on address bus 44 indicating the address of the register that layer logic 34 will read. As an example of data transfer from register file 32 to layer logic 34, if control register 2 of file register 32 contains the range of addresses for the memory in the corresponding layer, then control processor 38 would issue a read to control register 2, and the output would be read by layer logic 34. Memory module 36 now contains the range information necessary to detect an address which is placed on the address bus 44. Upon receipt of the initialization parameters, memory module 36 can be accessed by control processor 38 via data bus 42, address bus 44 and R/W control 46.

Figure 4:
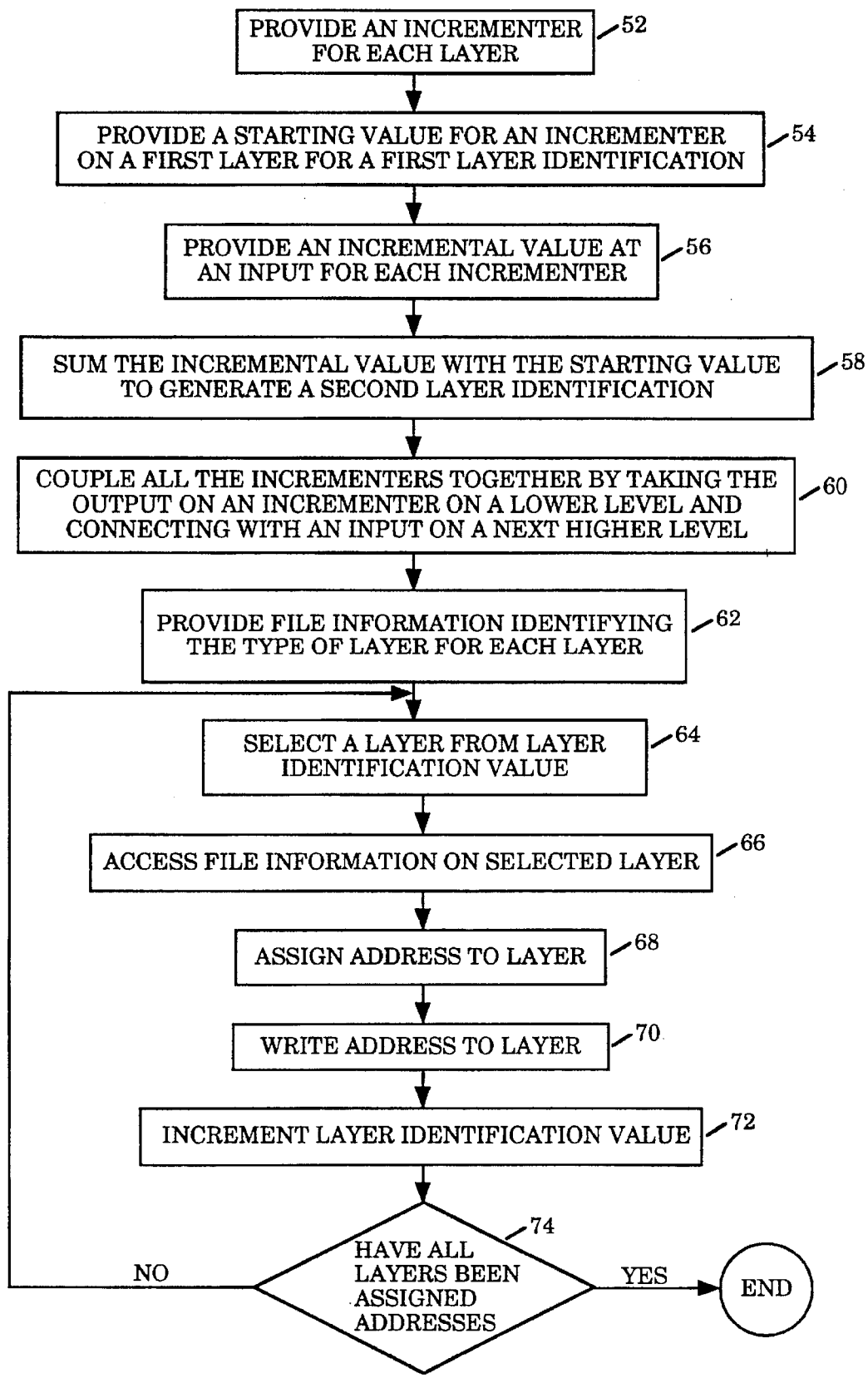
FIG. 4 is a flow diagram illustrating the method of assigning addresses in a three dimensional computer structure.

The method of the present invention is illustrated in FIG. 4. The layer identification values are generated in steps 52–60. After assigning layer identification values to each layer, the layers are assigned addresses as illustrated in steps 62–74.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for configuring a system including a plurality of layers to operate in a three dimensional structure, the apparatus comprising:

a register file coupled to each of the plurality of layers, said register file being configured to store file information including information identifying each of the plurality of layers as a processor module, a memory module, or an input/output (I/O) interface module;

a layer identification circuit coupled to a corresponding layer of the plurality of layers, said layer identification circuit being configured to generate a unique layer identification value and to output said unique layer identification value to a succeeding layer of the plurality of layers to configure said system;

a first bus configured to couple each of said layer identification circuits to a corresponding layer;

a state machine coupled to said first bus, said state machine being configured to access said file information from one of said plurality of layers to determine which of said plurality of layers includes a control processor; and said control processor configured to select a layer via said unique layer identification, to access said file information on said selected layer, to assign an address to said selected layer, and to write to said register file said address assigned to said layer.

2. The apparatus as claimed in claim 1, wherein each of said layer identification circuits comprises:

an incrementer circuit configured to generate an unique layer identification value, said incrementer circuit comprising an adder having at least a first input and a second input, the first input capable of receiving a starting value that provides a layer identification value for said layer connected to the incrementer circuit, the second input capable of receiving an incremental value, said incremental value being summed with said starting value input into said first input of the adder so as to generate said unique layer identification value for transmission to a layer succeeding said layer connected to the incrementer circuit; and said bus for serially coupling each of said layer identification circuits such that said unique layer identification value from said adder of layer connected to the incrementer circuit is said first input to an adder of the succeeding layer.

3. The apparatus as claimed in claim 2 wherein said incrementer circuit further comprises a register coupled to said adder for retaining said layer identification value.

4. The apparatus as claimed in claim 2 wherein said starting value is zero.

5. The apparatus as claimed in claim 2 wherein said incremental value is one.

6. An apparatus for configuring a computer system in a three dimensional structure, said computer system comprising:

a bus; and a plurality of layers coupled to the bus, each of the plurality of layers includes a register file coupled to said bus, said register file being configured to store file information including information identifying each of said plurality of layers as a processor module, a memory module, or an input/output (I/O) module, and a layer identification circuit coupled to said bus and a second layer identification circuit of a succeeding layer, the layer identification circuit configured to generate a unique layer identification value and to output said unique layer identification value to said succeeding layer to configure said computer system, said layer identification circuit including an incrementer circuit capable of generating said unique layer identification value, said incrementer circuit comprising an adder having a first input receiving a layer identification value and a second input receiving an incremental value, the first and second inputs being summed to produce said unique layer identification value, and a state machine coupled to said bus, the state machine capable of accessing said file information from one of said plurality of layers to determine which of said plurality of layers includes a control processor, and of issuing a start command to said control processor so that said control processor (i) selects one of the plurality of layers by transferring a selected layer identification value onto the bus, (ii) accesses said file information from said one of the plurality of layers, (iii) assigns an address to said one of the plurality of layers, and (iv) writes said address assigned to said one of the plurality of layers to said register file.

7. The apparatus as claimed in claim 6 wherein said control processor further comprises assignment means for assigning addresses to each component on said layer.

8. The apparatus as claimed in claim 7 wherein said assignment means further comprises interleaving means for interleaving said address assignment.

9. The apparatus as claimed in claim 7 wherein said file means further comprises self test information means for providing results of a memory self test when said layer is identified as a memory module.

10. The apparatus as claimed in claim 9 wherein said assignment means assigns continuous addresses to said memory module so as to skip portions of memory when said memory self test indicates said portions of memory within said memory module are bad.

11. The apparatus according to claim 6, wherein the bus includes at least a layer select bus.

12. The apparatus according to claim 6, wherein the bus system further includes a communication bus having an address, data and read/write buses.

13. A method for configuring a computer system in a three dimensional architecture including a plurality of layers, the method comprising the steps of:

storing file information within each of the plurality of layers to identify whether a selected layer of said plurality of layers is a processor module, a memory module, or an input/output module;

coupling each of said plurality of layers via a first bus;

assigning a unique layer identification to each of the plurality of layers;

propagating a first unique layer identification value to each of said plurality of layers via said first bus during an initialization period in order to access said file information to determine which layer of the plurality of layers includes a control processor;

selecting each of said plurality of layers excluding the layer including the control processor for accessing said file information to identify whether said selected layer is the processor module, the memory module, or the input/output module;

assigning an address to said selected layer, said address being based on said file information; and writing said address assigned to said selected layer to a register of said register file of said layer.

14. The method as claimed in claim 13, wherein the step of assigning a unique layer identification value for each layer in said computer system comprises the steps of:

providing an incrementer for each layer of said three dimensional computer structure, said incrementer comprising an adder having two inputs and generating an output;

providing a starting value at a first input of said adder of the first layer in said three dimensional computer structure, said starting value being a layer identification value for said first layer;

providing an incremental value at a second input of said adder associated with each layer of said three dimensional computer structure;

summing said incremental value with said starting value at said first layer adder so as to generate a layer identification value for a second layer; and serially coupling the incrementer of the first layer to an incrementer of the second layer such that said output from said adder of the first layer is a first input to an adder of the second layer, said output from said first layer being said layer identification value for said second layer.

15. The method as claimed in claim 13 further comprising the steps of:

incrementing said unique layer identification value so as to select a layer succeeding the selected layer;

accessing said file information on said succeeding layer; and assigning an address to said succeeding layer, said address being based on said file information and said address assigned to said selected layer.

16. The method as claimed in claim 15 further comprising the step of returning to the incrementing step until all of said plurality of layers are assigned addresses.

17. The method as claimed in claim 16 wherein said step of assigning an address further comprises the step of assigning addresses to each component on said selected layer.

18. The method as claimed in claim 13 wherein the step of assigning an address further comprises interleaving said address assignment when said type identification indicates said selected layer is a memory module so as to enhance access time of said memory module.

19. The method as claimed in claim 13 wherein the step of providing file information further comprises providing self test information when said selected layer is identified as a memory module.

20. The method as claimed in claim 19 wherein the step of assigning an address further comprises the step of assigning continuous addresses to said memory module so as to skip portions of memory when said self test information indicates said portions of memory within said memory module are bad.

* * * * *